Dec. 13, 1932.  L. E. TYRRELL  1,891,072
GENERATOR EXCITATION SYSTEM
Filed May 30, 1930
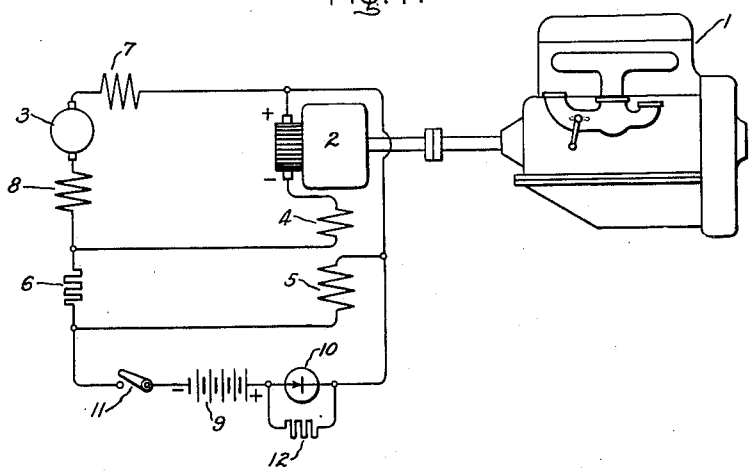
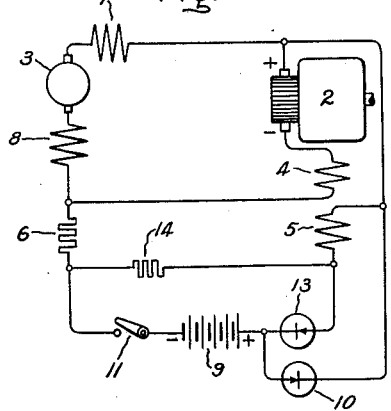 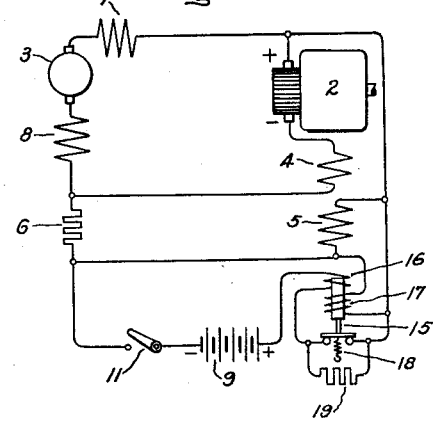
Inventor:
Laurance E. Tyrrell,
by Charles E. Mullan
His Attorney.

Patented Dec. 13, 1932

1,891,072

UNITED STATES PATENT OFFICE

LAURANCE E. TYRRELL, OF ERIE, PENNSYLVANIA, ASSIGNOR TO GENERAL ELECTRIC COMPANY, A CORPORATION OF NEW YORK

GENERATOR EXCITATION SYSTEM

Application filed May 30, 1930. Serial No. 457,671.

My invention relates to generator excitation systems and more particularly to auxiliary excitation systems for electric drive equipments wherein a gas engine or other prime mover is connected to a shunt generator for supplying power to a driving motor or motors.

In electric drive equipments of the type above referred to, as electrically propelled vehicles, for example, it has been proposed to utilize a separate source of power, as a battery, for providing auxiliary excitation of the main shunt field exciting winding of the generator during the starting period to increase the acceleration of the vehicle. This feature is disclosed and claimed broadly in an application by Walter C. Harris Serial No. 457,605 filed concurrently herewith, and assigned to the same assignee as the present invention, and is reserved to be protected by the patent granted thereon. In a system of the above described type employing a battery it is desirable that the battery be maintained in charged condition while in the vehicle so that it is in readiness at all times to deliver auxiliary exciting current to the generator shunt field exciting winding.

An object of my invention is to provide a generator having a shunt connected field exciting winding and auxiliary exciting means for the shunt field exciting winding including a battery which is utilized during the starting period, or when the generator voltage is below a predetermined value, and for automatically discontinuing the auxiliary excitation and causing a limited charging current to flow from the generator through the battery when the generator voltage exceeds a predetermined value.

My invention will be more fully set forth in the following description referring to the accompanying drawing, and the features of novelty which characterize my invention will be pointed out with particularity in the claims annexed to and forming a part of this specification.

Referring to the drawing, Fig. 1 is a partly diagrammatic view illustrating an excitation and battery charging system for gas-electric drive equipment; Fig. 2 is a view illustrating another form of excitation and charging system for gas-electric drive equipment, and Fig. 3 is a view illustrating a modification of the system shown in Fig. 1.

For convenience in illustration, my invention is shown in connection with a gas-electric drive equipment. The form of my invention shown in Fig. 1 comprises a gas engine 1 suitably coupled to a generator 2 having a shunt field exciting winding energized from the generator armature. The generator is provided with commutating and shunt field exciting windings 4 and 5, and is electrically connected to a driving motor 3, having a commutating field winding 7 and a main field winding 8. For the purpose of limiting the shunt field current of the generator, a shunt field resistance 6 is included in series with said field.

In operating vehicles of this kind the driving motors remain connected across the generator and control is effected entirely by manipulation of the engine throttle. When the vehicle is started the operator opens the throttle and the generator delivers heavy current to the driving motors at low voltage due to the fact that the motors are running at comparatively low speed. This causes the generator voltage to build up slowly which results in slow acceleration of the vehicle. In the arrangement shown the rate of building up of the field of the generator is increased so that the rate of acceleration of the vehicle is correspondingly increased by an auxiliary source of excitation for the shunt field exciting winding of the generator. In accordance with one aspect of my invention, this auxiliary excitation arrangement also includes a battery and such connections that the battery is charged by the generator during normal operation of the vehicle.

The circuit connections shown in Fig. 1 for obtaining auxiliary excitation of the shunt field exciting winding includes a battery 9, and reverse current controlling means 10, as an electric valve or asymmetrical conductor, which are connected in series and across the shunt field exciting winding 5 of the generator, the positive terminal of the battery being connected to the positive terminal of the generator.

A starting switch 11 controlled by the operator may also be included in the shunt circuit and may be suitably connected if desired with the throttle so as to be open when the throttle is closed and closed when the throttle is opened.

It will be noted that the voltage of the battery is opposed to the voltage of the generator and that the current controlling means 10 is arranged to restrict flow of current from the generator through the battery counter to its electromotive force. Current from the battery therefore tends to flow in parallel paths through the generator shunt field exciting winding and the generator armature. Accordingly, current flows through the generator shunt field from the battery 9 as long as the generator voltage is less than the battery voltage to cause an increase in the generator field excitation. In order that the generator voltage during the starting period shall be rapidly increased to a desired value by reason of the auxiliary excitation, the voltage of the battery 9 is so chosen that it approximates this value.

During the starting period when the generator voltage is comparatively low and less than that of the battery, the battery 9 causes an auxiliary exciting current to flow through the shunt field 5, the circuit being completed through the electric valve 10 which permits flow of exciting current from the battery in a direction to build up the generator field and restricts its flow in the opposite direction. Due to this increased excitation, the generator voltage is correspondingly increased and builds up rapidly which quickly accelerates the vehicle. The battery 9 continues to provide auxiliary exciting current as the generator voltage increases until the generator voltage equals or exceeds that of the battery. Since the generator voltage is applied across the circuit including the battery in opposition thereto, it will be apparent that exciting or reverse generator current will not tend to flow from the battery through the shunt field when the generator voltage equals or exceeds that of the battery. Moreover, when the generator voltage exceeds that of the battery the electric valve 10 will restrict reverse current flow through the battery.

For the purpose of charging the battery 9 when it is not supplying exciting current, as during normal operation of the vehicle, a suitable resistance 12 is connected across the electric valve 10 or equivalent, for the purpose of permitting a limited reverse or charging current to flow from the generator through the battery when the generator voltage is above that of the battery. The resistance 12, being in parallel with the valve 10, does not restrict the flow of exciting current from the battery through the electric valve 10 which allows current to flow freely therethrough in a direction to increase the shunt field excitation. Upon increase in the generator voltage to a value exceeding that of the battery, a limited amount of current flows around the valve 10 through the resistance 12 to cause charging of the battery. In this manner, the battery is maintained charged so that it is always in readiness to supply auxiliary exciting current.

In the arrangement illustrated in Fig. 2, the auxiliary excitation system is substantially the same as that illustrated in Fig. 1 except for a variation in the battery connections and the means for charging the battery during normal operation of the vehicle. In this arrangement wherein the battery is connected in series with the shunt field 5 during charging of the battery and in parallel therewith when providing auxiliary excitation, an electric valve or asymmetrical conductor 13 is connected in the series circuit between a terminal of the shunt field 5 and a terminal of the battery 9 and is arranged so as to admit charging or reverse current and restrict flow of exciting current from the battery. A suitable resistance 14 is connected across that part of the circuit including the battery 9 and valve 13 for proportioning the shunt field exciting current and battery charging current, as will be hereinafter explained.

The valve 10 which together with the battery 9 is in a circuit in parallel with the shunt field 5, is arranged to function in the manner above described in connection with Fig. 1 for allowing an auxiliary exciting current to flow from the battery through the shunt field winding during the starting period when the generator voltage is low and for restricting reverse flow of current through the battery.

Since the total exciting current traversing the shunt winding 5 during the period of auxiliary excitation also flows through the resistance 14, an increase in the exciting current produces a corresponding increase in voltage drop across the resistance 14. When this voltage drop reaches a value exceeding that of the battery 9, due to increase in the generator voltage exciting current from the battery ceases and current from the generator flows through the shunt winding 5 and divides in parallel paths through the resistance 14 and the charging circuit including the battery 9 and valve 13. The resistance 14 accordingly proportions the shunt field exciting current and the battery charging current during normal operation of the vehicle. In this arrangement, charging of the battery is accomplished more efficiently since the circuit for the charging current includes less resistance than in the arrangement shown in Fig. 1 wherein the resistance 12, in addition to the normal shunt field resistance, is also in the charging circuit. There are accordingly provided means adapted to place without change in circuit connections the battery either in series or in parallel with the shunt field, depending on whether the battery is to be charged or is to provide auxiliary excitation. The change in the battery circuits from exciting to charging current, and vice versa, is effected without necessity of control by the operator and is wholly in response to the generator voltage.

The energization of the shunt field exciting winding by the battery may, if desired, also be controlled by any suitable electro-responsive device, such as a relay. In the connections shown in Fig. 3, the controlling means comprises, by way of example, a reverse current relay 15 having a current coil 16 connected in series with the battery and a potential coil 17 energized from the generator. The relay is normally held closed by suitable means, as a spring 18, and is opened in response to energization of the current coil by reverse current. The battery 9 and the reverse current controlling means are in a circuit in shunt with the field coil 5 in the manner illustrated in Fig. 1 and it will be apparent that current from the battery 9 may flow through the contacts of relay 15 to increase the exciting current of the shunt field 5 in the manner previously described, during the starting period of the generator. Upon increase of generator voltage to a value greater than that of the battery, the auxiliary battery exciting current is stopped and reverse current from the generator flows through the battery and the current coil 16 of the relay. The relay is accordingly opened to break the shunt circuit and check the reverse flow of generator current through the battery. Once the relay is actuated to open position, energization of the potential coil 17 at normal generator voltage is sufficient to maintain the relay contacts open. When the engine throttle is closed, causing the engine and generator to drop to idling speed, the voltage impressed on the potential coil is insufficient to hold the relay contacts open, so that the relay closes and is in readiness for a subsequent accelerating operation.

A suitable resistance 19 as in Fig. 1, is connected across the terminals of the relay for permitting a limited charging current to flow through the battery when it is not delivering exciting current for maintaining it in charged condition.

It shall be understood that my invention is not limited to gas-electric drive equipment, but is applicable to any generator excitation system of the character described wherein auxiliary excitation of a main shunt field exciting winding is supplied by a battery, and I intend in the appended claims to cover all modifications which do not depart from the spirit and scope of my invention.

What I claim as new and desire to secure by Letters Patent of the United States, is:

1. In a generator excitation system, a shunt connected field exciting winding, a battery, means including an asymmetrical conductor for providing auxiliary excitation of the shunt field exciting winding of said generator by said battery when the voltage of said generator is less than the voltage of said battery, and means including a connection in parallel with said asymmetrical conductor for effecting charging of the battery when the voltage of said generator is greater than the voltage of said battery.

2. In an electrically propelled vehicle, a prime mover, a generator driven thereby, a shunt connected field exciting winding for said generator, a motor connected to said generator for propelling the vehicle, an excitation system for the shunt generator for effecting rapid acceleration of the vehicle during the starting period comprising a battery connected to the shunt field exciting winding of the generator, the voltage of said battery being opposed to the voltage developed by the generator, means including an asymmetrical conductor for supplying current from said battery through said field exciting winding in a direction to increase the field excitation when the voltage of said generator is less than the voltage of said battery, and means including a circuit in parallel with said asymmetrical conductor adapted to be traversed by current from said generator for effecting charging of said battery when said generator voltage is greater than the voltage of said battery.

3. An electrically propelled vehicle comprising an internal combustion engine, a generator driven by said engine, a shunt connected field exciting winding for said generator, a driving motor electrically connected to said generator, means for providing auxiliary exciting current for the shunt field exciting winding of the generator during the starting period thereof comprising a battery adapted to be connected to said shunt field exciting winding, the voltage of the battery being opposed to the voltage developed by the generator, means including an asymmetrical conductor connected in the battery circuit for supplying current from the battery through said shunt field exciting winding to increase the generator excitation when the voltage of the generator is below a predetermined value and for restricting reverse flow of current from the generator, and a second asymmetrical conductor connected to said battery in parallel with said first-named asymmetrical conductor for causing charging current to flow from the generator through the battery when the voltage of the generator exceeds said predetermined value.

4. In a generator excitation system including a shunt connected field exciting winding and a battery, means connecting said battery in parallel with said field exciting winding for providing auxiliary excitation of said winding by said battery when the voltage of said generator is less than a predetermined value, and means connecting said battery in series with said winding for causing charging of the battery by said generator when the generator voltage exceeds said predetermined value.

5. In a generator excitation system including a shunt connected field exciting winding and a battery, a circuit including a current controlling device connecting said battery in parallel with said exciting winding for providing auxiliary excitation of said winding by said battery when the generator voltage is less than a predetermined value, and another circuit including another current controlling device connecting said battery in series with said exciting winding for causing charging of the battery by said generator when the generator voltage exceeds said predetermined value.

6. In a generator excitation system including a shunt connected field exciting winding and a battery, an asymmetrical conductor connecting said battery in parallel with said field exciting winding for providing auxiliary excitation of said winding by said battery when the voltage of said generator is less than a predetermined value and a second asymmetrical conductor connecting said battery in series with said winding for causing charging of the battery by said generator when the generator voltage exceeds said predetermined value.

7. In a generator excitation system including a shunt connected field exciting winding and a battery, an asymmetrical conductor connected to said battery and winding for providing auxiliary excitation of said winding by the battery when the generator voltage is less than a predetermined value, and a second asymmetrical conductor likewise connecting said battery and winding for causing charging of said battery by the generator when the generator voltage exceeds said predetermined value.

8. An excitation system for a generator including a shunt connected field exciting winding and a battery, a resistance connected to said exciting winding across said battery, a current controlling device for providing auxiliary excitation of said winding by said battery when the generator voltage is less than a predetermined value, and a second current controlling device arranged in series with said winding for causing charging of said battery by said generator when the generator voltage exceeds said predetermined value, said resistance being effective to proportion the field exciting current and the battery charging current during normal operation of the generator.

In witness whereof, I have hereunto set my hand this 28th day of May, 1930.

LAURANCE E. TYRRELL.